US011030205B2

(12) United States Patent
Cui et al.

(10) Patent No.: US 11,030,205 B2
(45) Date of Patent: Jun. 8, 2021

(54) CONTEXTUAL DATA TRANSFORMATION OF IMAGE CONTENT

(71) Applicant: Microsoft Technology Licensing, LLC, Redmond, WA (US)

(72) Inventors: Yuancao Cui, Redmond, WA (US); Soohoon Cho, Seattle, WA (US); Vincent Kin-Wah Leung, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 338 days.

(21) Appl. No.: 15/868,568

(22) Filed: Jan. 11, 2018

(65) Prior Publication Data

US 2019/0179946 A1     Jun. 13, 2019

Related U.S. Application Data

(60) Provisional application No. 62/598,345, filed on Dec. 13, 2017.

(51) Int. Cl.
    *G06F 16/532*        (2019.01)
    *G06F 16/248*        (2019.01)
            (Continued)

(52) U.S. Cl.
    CPC .......... *G06F 16/248* (2019.01); *G06F 16/532* (2019.01); *G06F 16/951* (2019.01);
            (Continued)

(58) Field of Classification Search
    CPC ................. G06F 16/583; G06F 16/156; G06F 16/90335; G06F 16/532; G06F 16/538; G06F 16/9535
See application file for complete search history.

(56) References Cited

U.S. PATENT DOCUMENTS

| | | | |
|---|---|---|---|
| 2004/0158560 A1* | 8/2004 | Wen | G06F 16/3338 |
| 2004/0208385 A1* | 10/2004 | Jiang | A61B 5/0059 382/254 |

(Continued)

FOREIGN PATENT DOCUMENTS

WO     2012075315 A1     6/2012

OTHER PUBLICATIONS

"International Search Report and Written Opinion Issued in PCT Application No. PCT/US18/064144", dated Apr. 18, 2019, 14 Pages.

*Primary Examiner* — Sheryl L Holland
(74) *Attorney, Agent, or Firm* — Medley, Behrens & Lewis, LLC

(57) ABSTRACT

Non-limiting examples of the present disclosure describe processing by a contextual image analysis service that generates and surfaces contextually relevant data objects based on entities identified from image content. In one example, image content is analyzed and entity annotations are generated for the image content. The entity annotations may be converted to queries. Raw search results may be identified based on the converted queries. The raw search results may be filtered based on one or more specific content types. A contextual representation is generated based on the filtered raw search results, where the contextual representation comprises the image content and one or more contextually relevant data objects for at least one entity associated with the image content. The exemplary contextual representation of the image content and the one or more contextually relevant data objects may be surfaced through a user interface of an application/service.

20 Claims, 8 Drawing Sheets

(51) Int. Cl.
    *G06F 16/951*     (2019.01)
    *G06F 16/9532*     (2019.01)
    *G06F 16/955*     (2019.01)
    *G06F 16/9538*     (2019.01)
    *G06N 20/00*     (2019.01)
    *G06F 16/538*     (2019.01)

(52) U.S. Cl.
    CPC ...... *G06F 16/9532* (2019.01); *G06F 16/9538* (2019.01); *G06F 16/9558* (2019.01); *G06F 16/538* (2019.01); *G06N 20/00* (2019.01)

(56) References Cited

U.S. PATENT DOCUMENTS

| | | | |
|---|---|---|---|
| 2007/0255702 A1* | 11/2007 | Orme | G06F 16/338 |
| 2011/0258232 A1* | 10/2011 | Scriffignano | G06F 16/2462 |
| | | | 707/780 |
| 2014/0279994 A1 | 9/2014 | Gulli et al. | |
| 2015/0169525 A1* | 6/2015 | Palm | G06F 16/9558 |
| | | | 715/230 |
| 2017/0300495 A1* | 10/2017 | Sharifi | G06F 16/583 |

\* cited by examiner

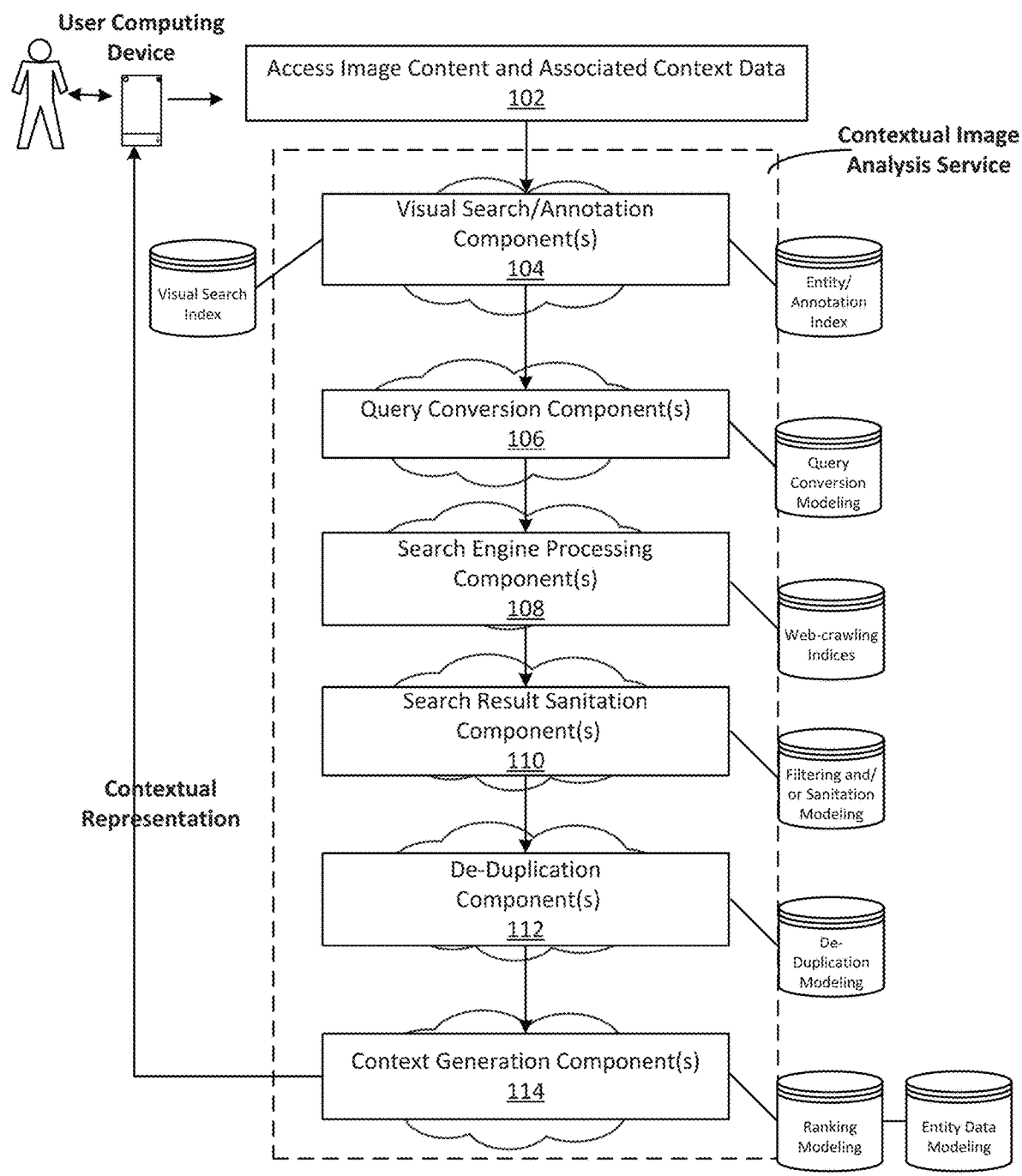

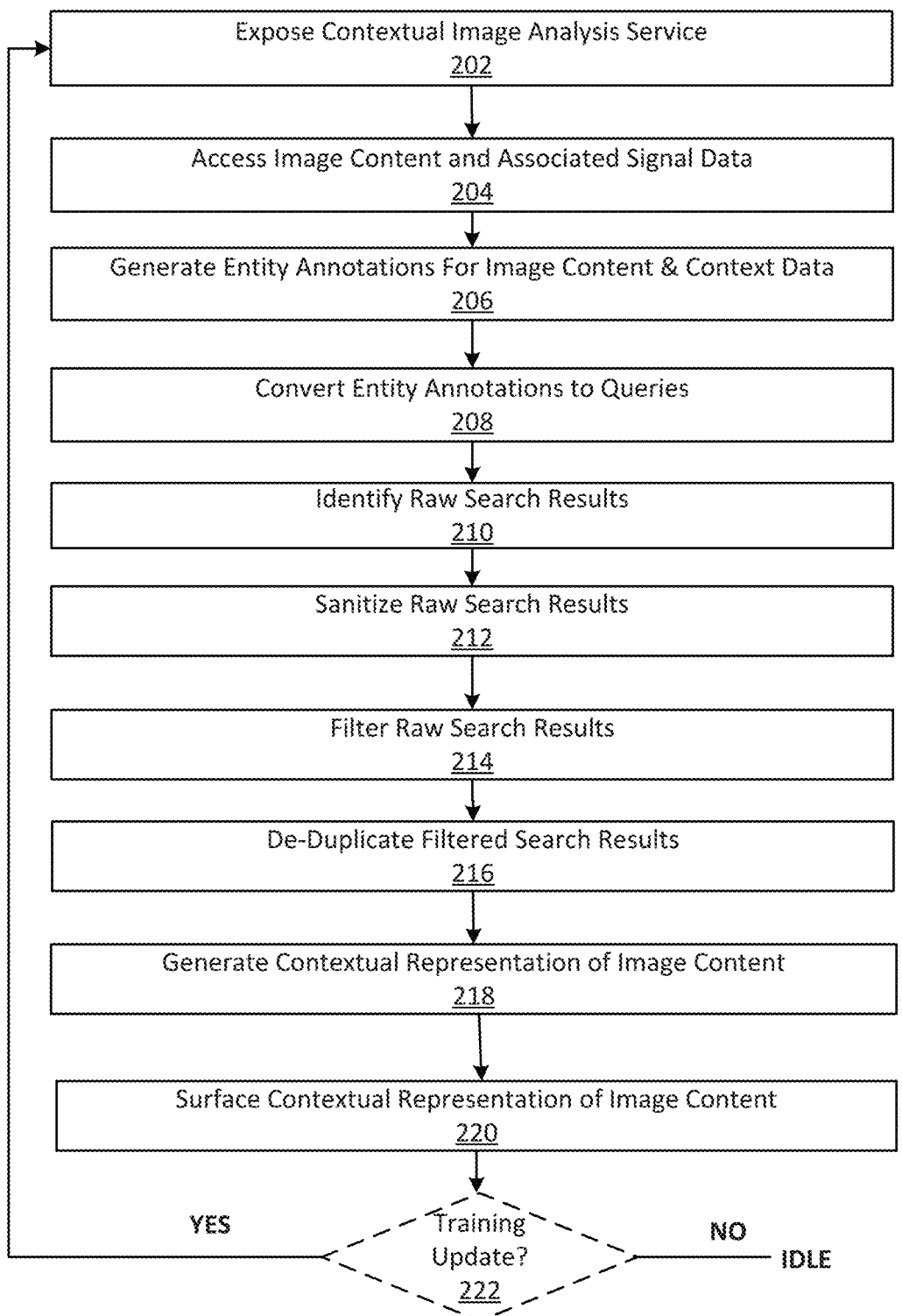

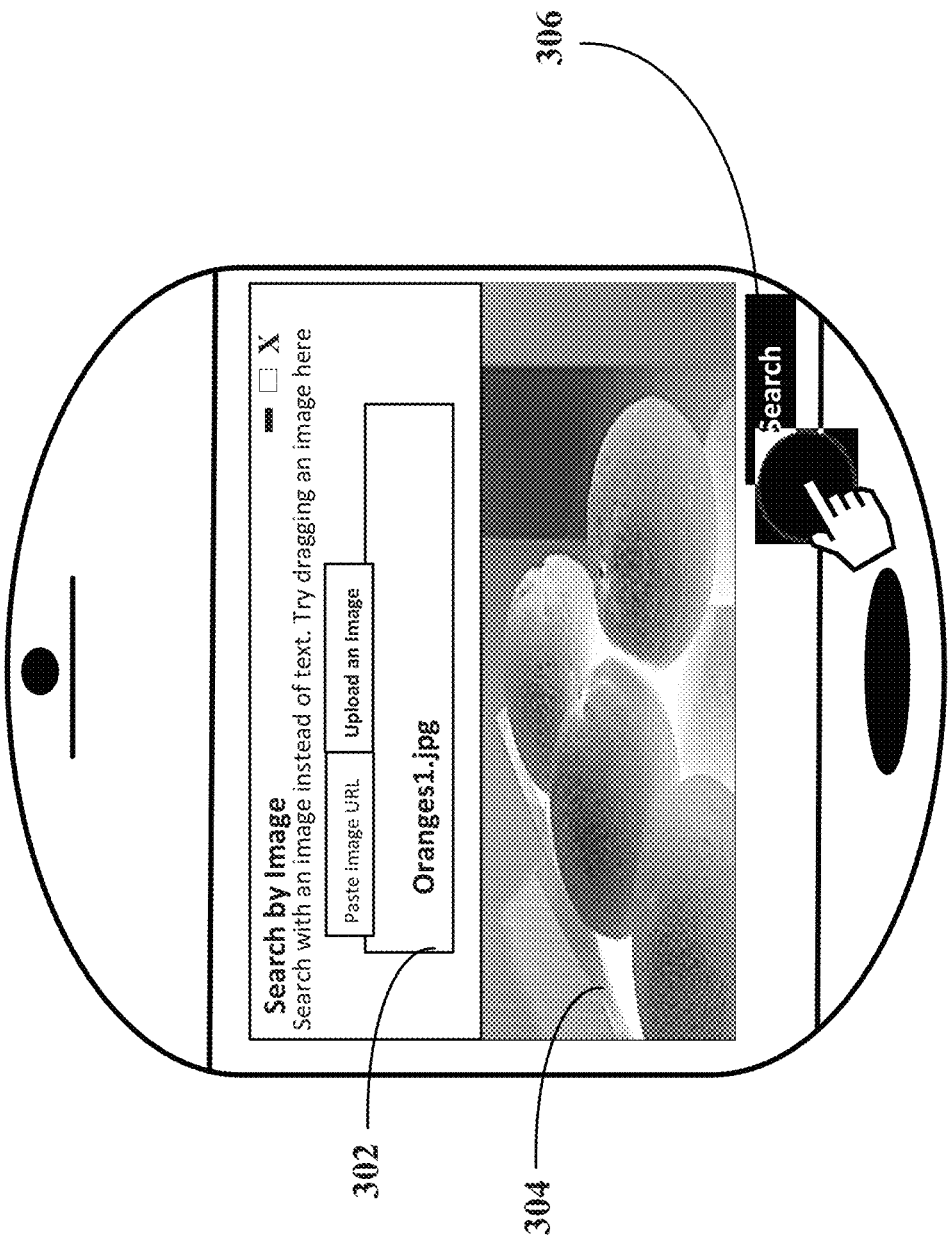

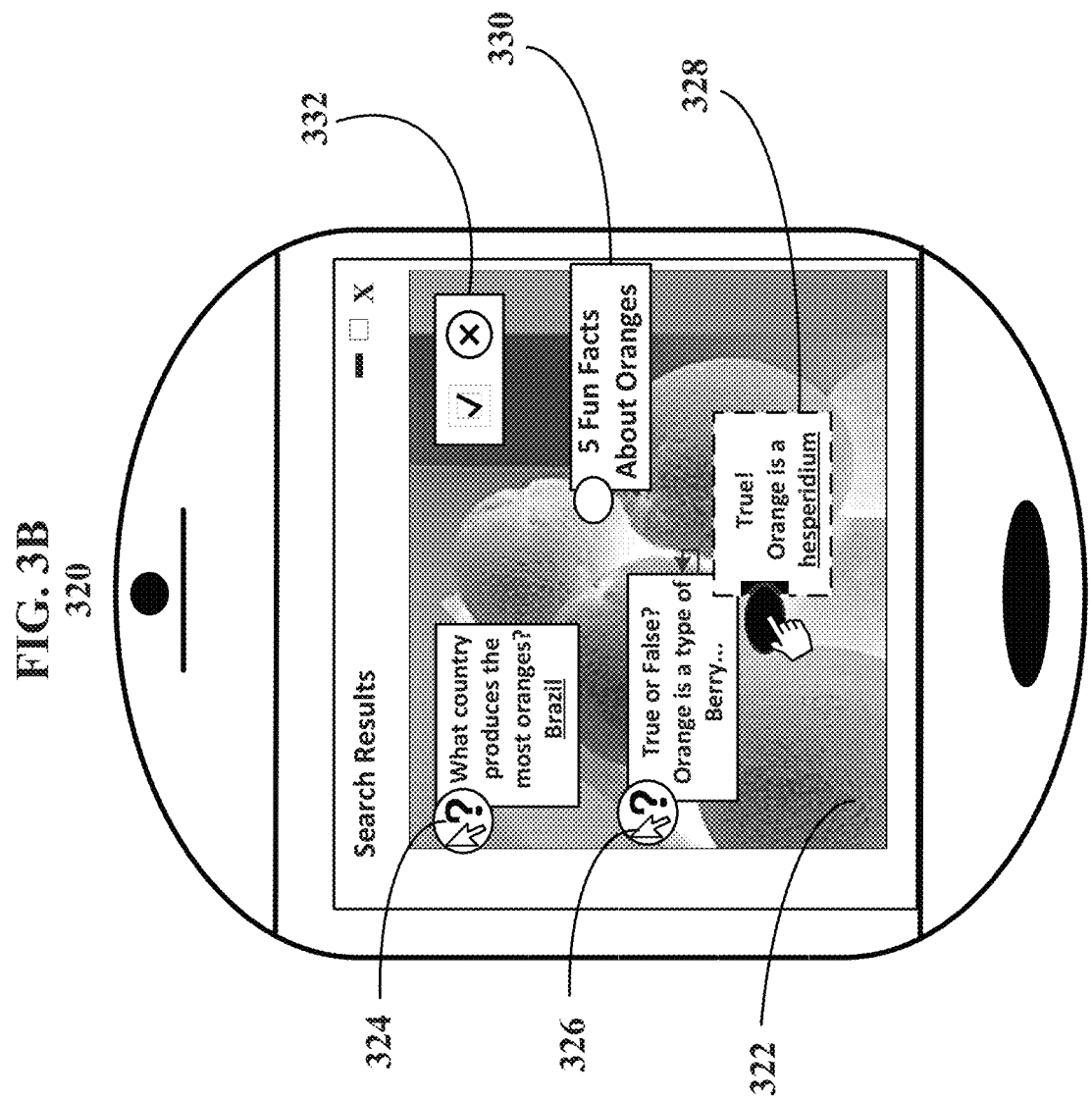

CONTEXTUAL DATA TRANSFORMATION OF IMAGE CONTENT

CROSS-REFERENCE TO RELATED APPLICATIONS

This application claims priority to U.S. Provisional Patent Application No. 62/598,345, entitled "CONTEXTUAL DATA TRANSFORMATION OF IMAGE CONTENT", filed on Dec. 13, 2017, which is incorporated by reference herein in its entirety.

BACKGROUND

When working with search engines, users typically know the question they want to ask and utilize search processing to seek answers in some sort of document (e.g., article, image, video). Search processing becomes more difficult when using an image as an input. Currently, search engines limit results returned for an image to visually similar images. The search engine may not know the context of what the user is looking for regarding the image, which limits the ability to return contextually relevant results.

In some cases, image understanding processing may be used to enhance different types of data that can be returned as search results. Image understanding processing may detect objects in an image and generate keywords to describe an image. Keywords may be passed to search applications to enable a search application to identify different types of results that can be returned. However, a 1:1 mapping of the keyword or object to a query (e.g., "pineapple" and search for pineapple) is not very interesting and does not provide context for what kind of information that a search service should actually return to the user. Further, such examples are limited in that that the results data is not further modified to fit a context of an image or integrated with (e.g., layered over) the image. Again, this limits processing and productivity of search engine services and fails to take advantage of the processing capabilities of computing devices that are utilized for search engine or retrieval processing.

SUMMARY

In view of the foregoing technical problems, non-limiting examples of the present disclosure describe processing by a contextual image analysis service that generates and surfaces contextually relevant data objects based on entities identified from image content. Examples described herein map image content and associated context data (e.g., signal data associated with the image content) to search results data that is modified and transform to generate contextually relevant data objects for entities identified in image content. For example, entities, keywords, annotations etc., may be identified from image content and used to generate data objects that are contextually relevant to the image content. The contextually relevant data objects may be surfaced in a contextual representation of the image content, for example, through a user interface of an application/service (e.g., a productivity service).

As an example, contextually relevant data objects may comprise but are not limited to: trivia data, factual data, audio data, advertisements, social network data, video data and other rich data objects, among other examples. In one instance, data objects are generated and associated with the image (or images), which may include specific objects within the image (or images). For instance, contextually relevant data objects may be generated and integrated within the image, layered over the image, and presented in accordance with actions (e.g., hover action, selection, scroll-over), among other examples. In some examples, content generation may comprise retrieving specific search results data and associating that search results data with image content in a visual representation. Processing operations executed by an exemplary contextual image analysis service are designed to improve processing efficiency in identifying contextual search results data for image content. In other examples, search results data may further be modified before being associated with image content. For instance, search result data may be retrieved and modified to fit a context of the image content.

In one example, visual search and annotation analysis may be executed on image content. For instance, image content may be received as input in a search query. However, examples described herein are not limited to only search query instances. For instance, image content in an application/service such as an imaging application/service may be analyzed to generate contextually relevant data objects for entities with an image. Image content may be one or more images. A visual search and annotation analysis service analyzes the image content, identifies similar images (e.g., nearest neighbor image detection) and generates entity annotations for the image content. The entity annotations may be converted to queries, which are subsequently processed. Raw search results may be identified based on the converted queries. The raw search results may be filtered based on one or more specific content types. In some instances, the raw search results may be de-duplicated to remove duplicative entries. Furthermore, the raw search results may be sanitized to ensure that contextually relevant data objects pertain to acceptable content for an application/service. A contextual representation of the image content is generated based on the filtered raw search results, where the contextual representation comprises the image content and one or more contextually relevant data objects for at least one entity associated with the image content. The exemplary contextual representation of the image content and the one or more contextually relevant data objects may be surfaced through a user interface of a productivity service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1 illustrates an exemplary process flow related to processing by a contextual image analysis service with which aspects of the present disclosure may be practiced.

FIG. 2 illustrates an exemplary method related to specific processing operations executed by an exemplary contextual image analysis service with which aspects of the present disclosure may be practiced.

FIGS. 3A-3B illustrate exemplary processing device views presenting user interface examples that illustrate results from processing by a contextual image analysis service with which aspects of the present disclosure may be practiced.

DETAILED DESCRIPTION

Figure 4A:
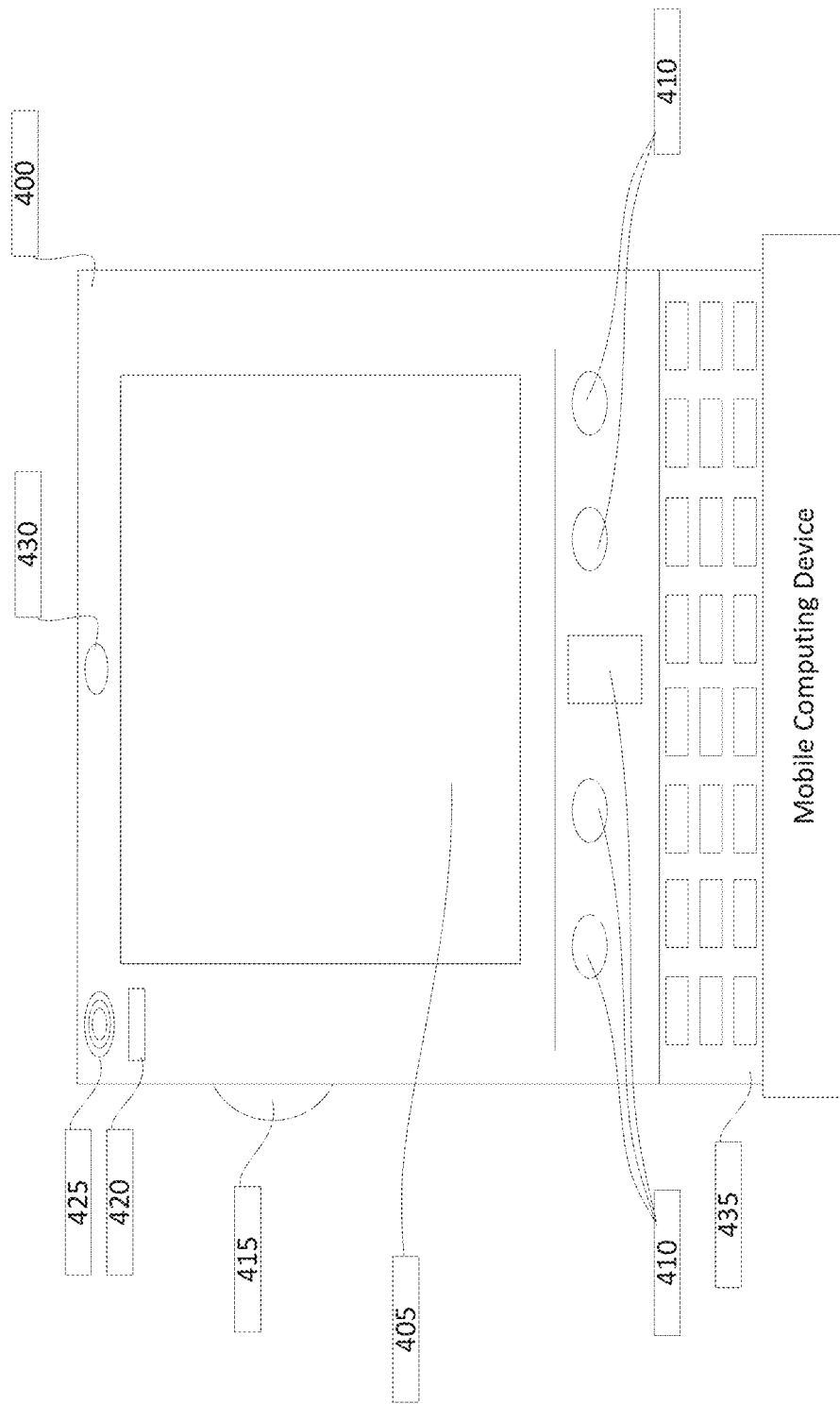
FIGS. 4A and 4B are simplified block diagrams of a mobile computing device with which aspects of the present disclosure may be practiced.

Non-limiting examples described herein relate to processing of a contextual image analysis service that generates and surfaces contextually relevant data objects based on entities identified from image content. Examples described herein map image content and associated context data (e.g., signal data associated with the image content) to search results data that is modified and transformed to generate contextually relevant data objects for entities identified in image content. For example, entities, keywords, annotations etc., may be identified from image content and used to generate data objects that are contextually relevant to the image content. The contextually relevant data objects may be surfaced, for example, through a user interface of a productivity service in a contextual representation of the image content. As an example, contextually relevant data objects may comprise but are not limited to: trivia data, factual data, audio data, advertisements, social network data, video data and other rich data objects, among other examples.

Examples described herein solve technical problems identified in the background through specific processing operations that are configured to identify context of an image content and proactively generate and surface contextual representations of image content. Processing efficiency is improved in identification and surfacing of contextually relevant content during execution of exemplary productivity services, for example, where more contextually relevant search results may be identified resulting in less query processing by content retrieval services and reduction in application/service resource usage (e.g., cross-application usage) in order to identify contextually relevant content, among other examples. In some examples, content generation may comprise retrieving specific search results data and associating that search results data with image content in a visual representation. Processing operations executed by an exemplary contextual image analysis service are designed to improve processing efficiency in identifying contextual search results data for image content. In other examples, search results data may further be modified before being associated with image content. For instance, search result data may be retrieved and modified to fit a context of the image content.

An exemplary implementation of the contextual image analysis service processes image content (e.g., one or more images) as an input (whether uploaded by a user's device like a smartphone or desktop, an image from a search engine's index, or a URL from the web) and analyzes the image for entities/objects in the image. Processing operations are further executed to generate annotations (e.g. entity annotations, keywords) of these objects (e.g., dog, flower, car) or keywords describing the image (e.g., indoor, beach). Once these keywords, or entity annotations, are generated, the contextual image analysis service executes further processing operations that may comprise: converting the keywords to queries, identifying search results for the queries, curating the search results and generating contextually relevant data objects from the curated search results. Further details regarding specific processing operations executed by an exemplary contextual image analysis service are provided in the subsequent description. In some examples, the contextual image analysis service may be configured to generate a representation of the image content that comprises one or more contextually relevant data objects. In other instances, the contextual image analysis service is configured to transmit the one or more contextually relevant data objects to an exemplary application/service for surfacing. In such instances, a system may comprise two or more exemplary applications/services executing together to create a representation of the image content that is associated with the one or more contextually relevant data objects.

Accordingly, the present disclosure provides a plurality of technical advantages, among other benefits, that include but are not limited to: generation, training and implementation of an exemplary contextual image analysis service; achieving image recognition precision and recall to enable generation of contextually relevant data objects for entities of image content; improving scalability for integrating an exemplary contextual image analysis service with/within other applications/services (e.g., applications/services of a software platform); improved processing efficiency of computing devices associated with an exemplary contextual image analysis application/service and/or content retrieval service (e.g., providing more relevant content retrieval, reduction in processing cycles and latency through minimization of the amount of queries being received, better management of storage/memory of computing devices) for computing devices that are utilized for processing operations described herein; improving cross-application usage and productivity of retrieval-based services (e.g., search engine services); and improved user interaction and productivity with front-end user interfaces and associated applications/services that interface with an exemplary contextual image analysis service, among other examples.

FIG. 1 illustrates an exemplary process flow 100 related to processing by a contextual image analysis service with which aspects of the present disclosure may be practiced. Process flow 100 illustrates an overall exemplary process flow for components of an exemplary contextual image analysis service. Further specifics regarding processing operations executed by components of an exemplary contextual image analysis service are provided in the description of method 200 (FIG. 2). As an example, process flow 100 may be executed by an exemplary computing device (or multiple computing devices) and/or system such as those shown in FIGS. 4A-6. In one example, processing described herein by a contextual image analysis service may be executed by one or more server computing devices, which may interface with client computing devices executing exemplary applications/services that may be used to access image content.

An exemplary contextual image analysis service is a service (or alternatively set of programmed processing operations configured to work with/within an application/service) that executes processing operations for analysis of image content and generation of contextual representation(s) of image content. An exemplary contextual image analysis service may be a standalone service or configured as an interfacing component of another application/service. The contextual image analysis service may execute processing operations described herein in real-time or near-real-time while a user is accessing image content (e.g., query processing, image content being accessed) or image analysis and processing may occur as background processing (e.g. offline processing) where a user is not actively accessing the image content. For instance, image content may be added to a storage/memory of a computing device or distributed storage service, where the contextual image analysis service may interface to provide contextual analysis of image content that can be provided to applications/services executing across one or more computing devices. An exemplary contextual image analysis service may comprise components including but not limited to: a visual search/annotation component 104, a query conversion component 106, a search engine processing component 108, a search result sanitation component 110, a de-duplication component 112 and a context generation component 114. Components described herein may be hardware and/or software components. Components of an exemplary contextual image analysis service may be configured as a system and/or service that execute computer programs, application programming interfaces (APIs), neural networks or machine-learning processing and semantic and entity understanding modeling, among other examples. In one example, an exemplary contextual image analysis service may comprise one or more trained models that execute processing operations described herein. In some examples, an exemplary contextual image analysis service is configured to interface with other applications/services (e.g., through APIs) to achieve processing described herein.

In process flow 100, image content and associated context data for the image content is accessed 102 by an exemplary contextual image analysis service. In one example, image content and associated context data may be accessed 102 in real-time, for example, where a user is accessing image content through an application/service. That is, a user may be utilizing a computing device to access image content through an application/service. Among other examples, a user may upload an image file while conducting an image search through a search engine service. However, examples described herein are not so limited and may extend to any instance where image content is stored on a user computing device or distributed storage or near-real-time examples. Image content may comprise one or more image files, for example, that are stored in a memory of a computing device and/or a distributed network storage (and accessed via a client computing device). Context data (or context for the image content) may comprise signal data that accompanies the image content. Context data may be in the form of metadata that is directly associated with the image content (properties, tagging, fields, storage location (e.g., folders, labels), capture of the image content (e.g., timestamp data, geo-locational data, computing device used to capture image, application/service used to capture), modification of the image content, sharing of the image content (e.g., via social networking services) and user signal data (e.g., user profile data), among other examples. Capture of image content and associated signal data (e.g., context) is known to one skilled in the field of art. Image content and associated context data may be propagated for further analysis by subsequent components of the contextual image analysis service. Such data may be useful in processing for matching of images (e.g. visual similarity), annotation (e.g., identification of entities, objects, persons), query generation and filtering of search results, among other operations.

The contextual image analysis service may comprise a visual search/annotation component 104 (or components). The visual search/annotation component 104 is configured to execute processing operations for visual search analysis of accessed image content. Visual search analysis may comprise access to one or more visual indexes (e.g., databases) that are utilized to match image content (or portions thereof) to existing image content. Visual search analysis methodologies may comprise one or more of: nearest neighbor visual search analysis, image classification (e.g., categorical image classification) analysis and/or instance retrieval analysis, among other examples. Processing for such visual search analysis methodologies are known to one skilled in the field of art. Visual search analysis may further comprise annotating the image content based on execution of one or more visual search analysis methodologies. Other examples of databases, indices and knowledge repositories that may be accessed for visual search and entity annotation comprise but are limited to: entity answer databases/knowledge graphs, question and answer applications/services, image insight analysis applications/services, video detail analysis applications/services, bar code recognition applications/services, optical recognition applications/services and social networking applications/services, among other examples.

Furthermore, the visual search/annotation component 104 may be further configured to execute processing operations for annotation (e.g., entity identification) of the accessed image content. The visual search/annotation component 104 may be configured to execute semantic analysis on image content and associated context data. In doing so, the visual search/annotation component 104 is configured to utilize results of the visual search processing (including visual images and annotations) and analyze context data associated with the image content to generate identity annotations for the image content. Entity annotations may comprise identified entities in the image content as well as entities associated with the context data (e.g., user identification, geo-locational data identification, timestamp identification). Such data may useful to generate contextual queries for the image content. One or more annotation indices (e.g., annotation databases, knowledge repositories, entity data models, knowledge graphs, click-log data) may be accessed to identify entity annotations and relationships between entities identified in the image content. Further examples of resources that may be accessed is provided in the foregoing description. Specific processing for entity identification and entity annotation is known to one skilled in the field of art.

An exemplary contextual image analysis service may further comprise a query conversion component 106 (or components) that are configured to generate search queries based on the entity annotations. The query conversion component 106 is configured to transform the entity annotations into queries, for example, by pre-fixing content to the entity annotations based on determined relevance of the entity annotations. For example, processing operations may be executed that evaluate the number of entities identified in the image content, relationships between the entities, etc. In one instance, image content where a waterfall is identified may yield contextual relevance for creation of a waterfall chart in a spreadsheet productivity service. Alternatively, identification of a waterfall with other entities such as "Nature" and "Outdoor" may direct contextual relevance to the natural waterfall (e.g., possibly contextually relevant data objects about where waterfalls come from). In another instance, an entity of a waterfall plus identification of other entities such as "nature" and contextual data for location (e.g., geo-locational data for Washington state) may direct contextual relevance to waterfall hiking trails in Washington state.

As non-limiting examples, content that is prefixed to the entity annotations may comprise: question words (e.g., how, what, where, why, which, who, when), keywords (e.g., trivia, facts, audio, video) and any other data relevant to specific content types (e.g., top searches, related searches). In one example, exemplary entity annotations are converted into sentences that are searchable through a search engine application/service. In doing so, the query conversion component 106 may be configured to specify one or more content types (e.g., questions, trivia, facts, messages, recommendations) for query transformation of the entity annotations. This may assist in targeting queries for specific types of content. One or more data models may be executed by the query conversion component 106 to transform the entity annotations to searchable queries. Developers may generate and tailor a data model (or models) for query conversion and searching. For example, a query conversion model may be generated and applied to execute query conversion modeling. An exemplary query conversion model may be configured to transform the entity annotation to queries. In some examples, queries options may be filtered/disregarded based on inclusion of inappropriate or explicit content. For instance, if image content contains explicit, sexual or inappropriate content, the query conversion component 106 may configured to handle those types of images in specific ways. For instance, other entities in such image content may be focused on or the entities may be avoided all together. The generated queries may be propagated to an exemplary search engine processing component 108.

The contextual image analysis service further comprises a search engine processing component 108 (or components) that is configured to execute search processing for the generated queries and return search results for the searched queries. The search engine processing component 108 may be configured to access a plurality of web-crawling indices, databases, other applications/services, etc. to identify raw search results for the generated queries. In one example, search engine processing component 108 runs the generated queries through the search engine to identify raw search engine results of documents (e.g., articles, images, videos, hyperlinks, audio files). Raw search engine results are search results data that is received directly from search engine applications/service, third-party services, etc. and is not curated by the contextual image analysis service. In some examples, the returned search results are classified according to specific content types. Exemplary search processing of queries is known to one skilled in the fields of art.

Raw search results are propagated to an exemplary search result sanitation component 110 (or components) of the contextual image analysis service. The search result sanitation component 110 is configured to sanitize and filter the raw search results for subsequent processing by the contextual image analysis service. In doing so, the search result sanitation component 110 may be configured to apply one or more data models for filtering and/or sanitation of the raw search results. Sanitation of the raw search results comprises processing operations to clean up the raw results and remove extraneous and/or unrelated content, words/characters (e.g. things like "—Apr. 28, 2017"), link addresses, numbers, metadata, symbols, etc., that may not directly correlate to entities of the image content. Developers may program and train specific data models to parse and curate raw search results to identify most relevant portions of the raw search results, remove unrelated search results etc. In some examples, sanitation processing may comprise removing raw search results that include inappropriate or explicit content.

Further, the search result sanitation component 110 may be configured to filter the raw search results. In examples where sanitation processing occurs, the search result sanitation component 110 is configured to filter the sanitized search results. The search result sanitation component 110 may be configured to apply a single data model for sanitation and filtering of the raw search results or alternatively may be configured to apply different data models for sanitation and filtering processing. Filtering processing of the search result may comprise filtering the search results data based on specific content types (e.g., trivia, facts, rich data objects). In one example, filtering processing comprises operations to: parse the search results, classify the search results according to content type (e.g. identify which search results seem most like (most similar) to a specific content type), remove specific content types from further consideration (e.g., uninteresting options, non-trending options, inappropriate or explicit content, false positives, false negatives). Other non-limiting examples of types of filtering may further be applied such as: domain filtering, content filtering, device filtering, application/service filtering, user filtering, etc. In one example, filtering processing may comprise execution of processing operations to rank/score raw search results. Ranking/scoring processing is known to one skilled in the art, where data models may be configured to rank/score the raw search results based on specific inputs to a data model. N number of filtered search results may be propagated to the de-duplication component 112. Modeling for sanitation and/or filtering may be a learning model that is trained to identify and manage sanitation and filtering of search results data.

As referenced above, filtered search results are propagated to an exemplary de-duplication component 112 (or components) of the contextual image analysis service. The de-duplication component 112 is configured to execute processing that de-duplicates the filtered search results to ensure that there are unique search results in a set of search results that are used for generation of a contextual representation of image content that comprises one or more contextually relevant data objects. For instance, similar search results are identified where duplicative entries are removed (e.g., "5 ways to speed up your mobile phone" vs. "five ways to speed up your mobile phone"). In doing so, a de-deduplication data model may be executed, where developers may configure specific criteria for de-duplication processing. The de-duplication model may be a learning model that is trained to identify and manage duplicative search results.

De-duplicated search results are then propagated to an exemplary context generation component 114 (or components) of the contextual image analysis service. An exemplary context generation component 114 is configured to identify and/or generate contextual representation(s) of image content that comprises one or more contextually relevant data objects for entity data associated with the image content. As an example, contextually relevant data objects may comprise but are not limited to: trivia data, factual data, audio data, advertisements, social network data, video data and other rich data objects, among other examples. In one instance, data objects are generated and associated with the image (or images), which may include specific objects within the image (or images). For instance, contextually relevant data objects may be generated and integrated within the image, layered over the image, and presented in accordance with actions (e.g., hover action, selection, scroll-over), among other examples.

In some examples, context generation may comprise retrieving specific search results data and associating that search results data with image content in a visual representation. Processing operations executed by an exemplary contextual image analysis service are designed to improve processing efficiency in identifying contextual search results data for image content and overall processing of content retrieval application/services, among other examples. In other instances, search results data may further be modified before being associated with image content. For example, search result data may be retrieved and modified to fit a context of the image content. Contextually relevant data objects may modify a form and/or presentation of the de-duplicated search results, for example, to best fit a context of the image content.

The context generation component 114 may execute ranking/scoring modeling on the de-duplicated search results. For instance, a data model may be applied to rank the de-duplicated search results based on various criteria (e.g. relevance, authority, popularity, availability, performance, domain, user-focused, crowd-sourced (e.g., click-log data), telemetric data). Developers may set criteria for ranking/scoring of the de-duplicated search results. The ranking/scoring by the content generation component 114 may be used to identify most relevant contextual content for the image content. An exemplary contextual representation may be generated based on the ranking/scoring of the de-duplicated search results data. For instance, ranked search results data may be provided to an exemplary application/service (e.g., productivity service). In another instance, the contextual image analysis service is configured to generate, based on the ranked search results data, one or more contextually relevant data objects for association with the image content. In such an instance, the contextually relevant data objects may be propagated to an exemplary application/service for subsequent processing. In yet another example, the contextual image analysis service is configured to generate a contextual representation of the image content, where the contextual representation comprises one or more of the contextually relevant data objects and the image content. As identified in the foregoing description, an exemplary contextually relevant data object may correlate to entity data associated with the image content.

In examples where contextually relevant data objects are generated, the contextual image analysis service may be configured to utilize the ranked and de-duplicated search results to generate the contextually relevant data objects. Generation of the contextually relevant data objects may comprise modifying, for content of the de-duplicated search result: size/mass, formatting, layout, arrangement, presentation, layering, finding related content, etc. In one example, a snippet of search result data is generated for association with the image content. In some examples, an entity data model may be utilized to identify data objects for generation based on specific search results data. For instance, an entity data model may be utilized to identify relationships between entities in search results data and other content that may be utilized to generate contextually relevant data objects. In one example, an entity such as orange (fruit) may be identified, where contextually relevant data objects for different oranges (e.g. mandarin orange, sweet orange, clementine) or alternative forms of an orange (e.g. orange juice) and other fruits (e.g., peach, banana, apple), among other examples.

In one example, the context generation component 114 is configured to generate the contextually relevant data objects and transmit the contextually relevant data objects to an application/service for surfacing. For instance, a specific application/service may request contextually relevant data objects for specific content types (e.g., facts, trivia, advertisements, links, social networking posts), where the application/service may present the contextually relevant data objects along with the image content (e.g., layered over the image content, presented in a different user interface feature from that of the image content). In another example, the context generation component 114 is configured to generate the contextual representation of the image content that comprises one or more contextually relevant data objects. An exemplary contextual representation is illustrated in FIG. 3B. In other instances, the context generation component 114 is configured to rank the de-duplicated search results and pass the search results data to another application/service for subsequent modification of the search results data. In such examples, the content generation component 114 is configured to interface with other application/services to transmit the ranked results data to the specific application/service.

Moreover, the context generation component 114 may be configured to evaluate the image content as well as the ranked and de-duplicated search results data to determine best possible presentation of the contextual representation and/or contextually relevant data objects so as to not affect productivity and user experience with an exemplary productivity service. An exemplary contextual image analysis service may be configured to provide a specific number of contextually relevant data objects based on spatial data associated with any of: a client browser, user interface of a productivity service, the image content and specific search results data, among other examples. Further, the contextual image analysis service may adapt over time and learn placement, positioning, size, amount, etc. of contextually relevant data objects to present. In some cases, this may be user specific based on signals collected and analyzed for a user (or group of users). In other instances, user interface features may be presented that enable users to manually control the experience.

In alternative examples, a new entry point may be created for display of contextual representations of image content. For instance, a separate entry point may avoid some of the potential productivity and usability issues that might arise where users are familiar with and prefer existing user experiences. For example, a search engine application/service may be configured to present, through the user interface, an entry point to obtain contextually relevant data objects for image content. In other examples, an exemplary entry point for contextual representations may be an add-on or selectable feature that may be toggled on/off.

In any example of process flow 100, contextually relevant data objects are provided to a user computing device for example, for surfacing through an exemplary application/service (e.g., productivity service). In some examples, contextually relevant data objects may be interactive (e.g., rich data objects) that enable users to select content, additional data, suggestions, etc. In one example, a contextually relevant data object may be trivia associated with a specific entity of the image content. In one instance, a question and answer may be surfaced together through a user interface of an application/service. In another instance, a user may interact with a contextually relevant data object to view an answer to a trivia question (e.g., bifurcated presentation of the contextually relevant data object).

FIG. 2 illustrates an exemplary method 200 related to specific processing operations executed by an exemplary contextual image analysis service with which aspects of the present disclosure may be practiced. As an example, method 200 may be executed by an exemplary computing device (or computing devices) and/or system such as those shown in FIGS. 4A-6. For instance, processing operations described herein may be executed by one or more components of contextual image analysis service (as described in process flow 100, FIG. 1) that may be configured to interface with a computing device (or devices) and/or applications/services executing thereon. Operations performed in method 200 may correspond to operations executed by a system and/or service that execute computer programs, application programming interfaces (APIs), neural networks or machine-learning processing and semantic and entity understanding modeling, among other examples. As an example, processing operations executed in method 200 may be performed by one or more hardware components. In another example, processing operations executed in method 200 may be performed by one or more software components. In some examples, processing operations described in method 200 may be executed by one or more applications/services associated with a web service that has access to a plurality of application/services, devices, knowledge resources, etc. In one instance, processing operations described in method 200 may be implemented by one or more components connected over a distributed network.

Method 200 begins at processing operation 202, where an exemplary service for contextual image analysis processing is exposed for interfacing with other applications/services. An exemplary service for contextual image analysis processing may be a contextual image analysis service as referenced in the foregoing description of process flow 100 (FIG. 1).

An exemplary application/service that interfaces with a contextual image analysis service is a productivity service. An exemplary productivity application/service is an application/service configured for execution to enable users to complete tasks on a computing device. Examples of productivity services comprise but are not limited to: word processing applications/services, spreadsheet applications/services, notes/notetaking applications/services, authoring applications/services, e-commerce domain applications/services, digital presentation applications/services, search engine applications/services, email applications/services, messaging applications/services, web browsing applications/services, collaborative team applications/services, directory applications/services, mapping services, calendaring services, electronic payment services, digital storage applications/services and social networking applications/services, among other examples. In some examples, an exemplary productivity application/service may be a component of a suite of productivity applications/services that may be configured to interface with other applications/services associated with a platform. For example, a word processing service may be included in a bundled service (e.g., Microsoft® Office365® or the like). Further, an exemplary productivity service may be configured to interface with other internet sources/services including third-party application/services, for example, to enhance functionality of the productivity service.

Exposure (processing operation 202) of an exemplary contextual image analysis service may comprise processing operations (e.g., calls, requests/responses) between an application/service and the contextual image analysis service. In one example, an application/service may interface with an exemplary contextual image analysis service through an API. Moreover, exposure (processing operation 202) of the contextual image analysis service comprises providing an updated contextual image analysis service. Modeling provided as components of the contextual image analysis service may be continuously trained and updated to provide application/services with the highest precision and highest recall in a scalable form.

Method 200 may proceed to processing operation 204, where image content and associated signal data is accessed. Examples of access to image content by an exemplary contextual image analysis service are provided in the foregoing description of process flow 100 (FIG. 1). As an example, processing operation 204 may comprise receiving a request for access to the image content in real-time through an exemplary application/service (e.g. productivity service) that corresponds with active access to the image content. For instance, a user may be actively accessing the image content through a camera application/service of a mobile computing device, uploading the image content for an image search through a search engine service, etc. In other instances, access (processing operation 204) to a contextual image analysis service processing may not rely on an active usage of the image content by a user. For instance, the contextual image analysis service may be configured to parse image content of an application/service (on a computing device, distribute network resource, etc.) and proactively initiate the processing described herein to improve productivity of applications/services, among other examples. Although examples described herein focus on image content, it is to be understood that processing examples described herein can be extended to other types of content and/or data formats that may be annotated and searched. For example, processing operations described herein may be configured to work with data-interchange formats such as JSON (JavaScript Object Notation) data objects, audio files, video files, handwritten input, etc.

Flow of method 200 may proceed to processing operation 206. At processing operation 206, visual search and annotation analysis of image content is executed to generate entity annotations for the image content and associated context data. As an example, visual search and annotation analysis may be executed by visual search/annotation component(s) of the contextual image analysis service as described in the foregoing description of process flow 100 (FIG. 1). Visual search and annotation analysis may be executed on image content to generate exemplary entity annotations. For instance, image content may be received as input in a search query. However, examples described herein are not limited to only search query instances. Image content may be one or more images. The visual search and annotation analysis service analyzes the image content, identifies similar images (e.g. nearest neighbor image detection) and generates entity annotations for the image content through processing described in the foregoing description.

At processing operation 208, the generated entity annotations are converted to queries. Converted queries may be utilized to search for contextually relevant data for entities of the image content. As an example, query conversion may be executed by query conversion component(s) of the contextual image analysis service as described in the foregoing description of process flow 100 (FIG. 1).

Flow of method 200 may proceed to processing operation 210, where raw search results are identified based on the converted queries. Processing operation 210 may comprise searching one or more web indices to generate results data for searched queries. As an example, identification and/or generation of raw search results may be executed by search engine processing component(s) of the contextual image analysis service as described in the foregoing description of process flow 100 (FIG. 1).

The raw search results may be sanitized (processing operation 212). As an example, sanitation of the raw search results may be executed by search result sanitation component(s) of the contextual image analysis service as described in the foregoing description of process flow 100 (FIG. 1). Sanitation of the raw search results comprises processing operations to clean up the raw results and remove extraneous content, words/characters (e.g., things like "—Apr. 28, 2017") that may not directly correlate to entities of the image content. Processing operation 212 may further comprise propagating the sanitized search results for filtering based on one or more specific content types.

At processing operation 214, the sanitized search results may be filtered. As an example, filtering of the sanitized search results may be executed by search result sanitation component(s) of the contextual image analysis service as described in the foregoing description of process flow 100 (FIG. 1). Filtering (processing operation 214) of the search results data may comprise filtering the search results based on specific content types (e.g., trivia, facts, rich data objects). In one example, filtering processing comprises operations to: parse the search results, classify the search results according to content type (e.g., identify which search results seem most like (most similar) to a specific content type), remove specific content types from further consideration (e.g., uninteresting options, non-trending options, inappropriate or explicit content).

As an example, the specific content type is trivia data, and the one or more contextually relevant data objects are trivia data objects (e.g., questions and answers) that correspond to one or more entities of the image content. However, examples are not so limited and can also include, factual data, linked content, suggestions, etc. In one example, both the question and answer are provided for the user without the user needing to go to a link or external content to find an answer. In some cases, the contextually relevant data object may be multi-part (e.g. bifurcated), where a user may select a question and then receive the answer directly in a representation of the image context (and the contextually relevant data objects).

Flow of method 200 may proceed to processing operation 216. At processing operation 216, the filtered search results are de-duplicated. As an example, de-duplication of the filtered search results may be executed by de-duplication component(s) of the contextual image analysis service as described in the foregoing description of process flow 100 (FIG. 1). De-duplication processing (processing operation 216) ensure that there are unique search results in a set of search results that are used for generation of a contextual representation of image content that comprises one or more contextually relevant data objects. For instance, similar search results are identified where duplicative entries are removed (e.g., "5 ways to speed up your mobile phone" vs. "five ways to speed up your mobile phone").

At processing operation 218, a contextual representation of the image content is generated based on the filtered raw search results. As an example, processing operations for generation of the contextual representation(s) may be executed by the context generation component(s) of the contextual image analysis service as described in the foregoing description of process flow 100 (FIG. 1). An exemplary contextual representation comprises the image content and one or more contextually relevant data objects for at least one entity associated with the image content. Examples of contextual representations have been provided in the foregoing description.

Flow of method 200 may proceed to processing operation 220, where an exemplary contextual representation is surfaced through a user interface of an application/service (e.g., productivity service). Examples of interaction between an exemplary contextual image analysis service and productivity applications/services are described in the foregoing description of process flow 100 (FIG. 1), for example, in reference to the context generation component(s) of the contextual image analysis service. An example of a contextual representation of image content being surfaced through a user interface is provided in processing device view 320 (FIG. 3B).

Flow of method 200 may proceed to decision operation 222, where it is determined whether a training update occurs to the contextual image analysis service. As identified in the foregoing description, the contextual image analysis service may be continuously updated, where one or more components of the contextual image analysis service are updated based on an update to training data, telemetric data, etc. In examples where no update occurs to the contextual image analysis service, flow of decision operation 222 branches NO and processing of method 200 remains idle until subsequent processing is to occur. In examples where one or more components of the contextual image analysis service are updated, flow of decision operation 222 branches YES, and processing of method 200 returns to processing operation 202, where an updated contextual image analysis service is exposed for subsequent processing.

FIGS. 3A-3B illustrate exemplary processing device views presenting user interface examples that illustrate results from processing by a contextual image analysis service with which aspects of the present disclosure may be practiced. User interface examples are shown in association with exemplary productivity applications/services, where processing device views shown in FIGS. 3A-3B are front-end examples of processing operations that correspond to surfacing of exemplary contextually relevant data objects in association with the image content based on execution of the processing operations described in FIG. 1 (process flow 100) and FIG. 2 (method 200).

FIG. 3A comprises processing device view 300 that illustrates access to a user interface of an exemplary productivity application/service such as a search engine application/service. As can be seen in processing device view 300, a user is utilizing its computing device to execute a search query using image content. For instance, a user is uploading image content 302 ("Oranges1.jpg") as a search query through the search engine application/service. A preview 304 of the image content 302 is also displayed in processing device view 300, for example, providing the original image content before a search query is executed. The user may execute the search query of the image content 302 through action 306, by selecting the user interface feature for search execution.

FIG. 3B comprises processing device view 320 that illustrates a continuing example from processing device view 300 (FIG. 3A). Processing device view 320 illustrates results of processing of the image content by an exemplary contextual image analysis service as described in the foregoing description. As can be seen in processing device view 320, an exemplary contextual representation 322 of the image content 302 is generated and displayed through the user interface of the search engine application/service, for example, in response to processing of the search query. The contextual representation 322 comprises a plurality of contextually relevant data object for an identified entity of the image content 302. As can be seen in the preview 304 of the image content 302 (FIG. 3A), the image content 302 comprises an image of a plurality of oranges. Processing by the contextual image analysis service yields generation of contextually relevant data objects 324-330, which are presented in association with the image content 302 (e.g., layered over the preview 304).

A first contextually relevant data object 324, is a trivia data object that provides a contextually relevant trivia question that corresponds to an identified entity (i.e. oranges) of the image content 302. A second contextually relevant data object provides an interactive bifurcated trivia question/answer that comprises a question 326 and an answer 328 for the user, where the second contextually relevant data object corresponds to the identified entity (i.e. oranges). In one example, the question 326 may initially be presented for the user, where action may be taken (e.g., selection of the question 326, input to interact with the question 326, etc.) before the answer 328 is displayed. However, examples are no so limited. In some instances, the question 326 and the answer 328 may be simultaneously displayed, for example, when the contextual representation 322 is surfaced. A third contextually relevant data object 330 is presented that presents factual data corresponding with the identified entity of the image content 302 (i.e. oranges). Other alternative examples of contextually relevant data objects are provided in the foregoing description.

Further, additional user interface features may be presented along with a contextual representation 322. As shown in processing device view 320, user interface feature 332 is surfaced to enable a user to provide feedback for generated contextually relevant data objects. Such feedback (e.g., crowd-sourcing) may be useful to train an exemplary contextual image analysis service for generation of contextual representations 322 and/or specific contextually relevant data objects. Other examples of user interface features may be features for controlling display/surfacing of the contextual representation 322 and/or specific contextually relevant data objects, application specific command controls for specific productivity services that enable an interactive experience with the contextual representation 322, etc. In some instances, the contextual representation 322 may be configured to display for a predetermined period of time as to provide an interactive experience for a user without negatively affecting productivity of the productivity service. For instance, if multiple contextually relevant data objects are surfaced, this may obscure the image content and/or other content such as search results data, among other examples. An exemplary contextual image analysis service may adapt over time and learn placement, positioning, size, amount, etc. of contextually relevant data objects to present. In some cases, this may be user specific based on signal collected and analyzed for a user (or group of users). In other instances, user interface features may be presented that enable users to manually control the experience.

FIGS. 4A-6 and the associated descriptions provide a discussion of a variety of operating environments in which examples of the invention may be practiced. However, the devices and systems illustrated and discussed with respect to FIGS. 4A-6 are for purposes of example and illustration and are not limiting of a vast number of computing device configurations that may be utilized for practicing examples of the invention, described herein.

Figure 4B:
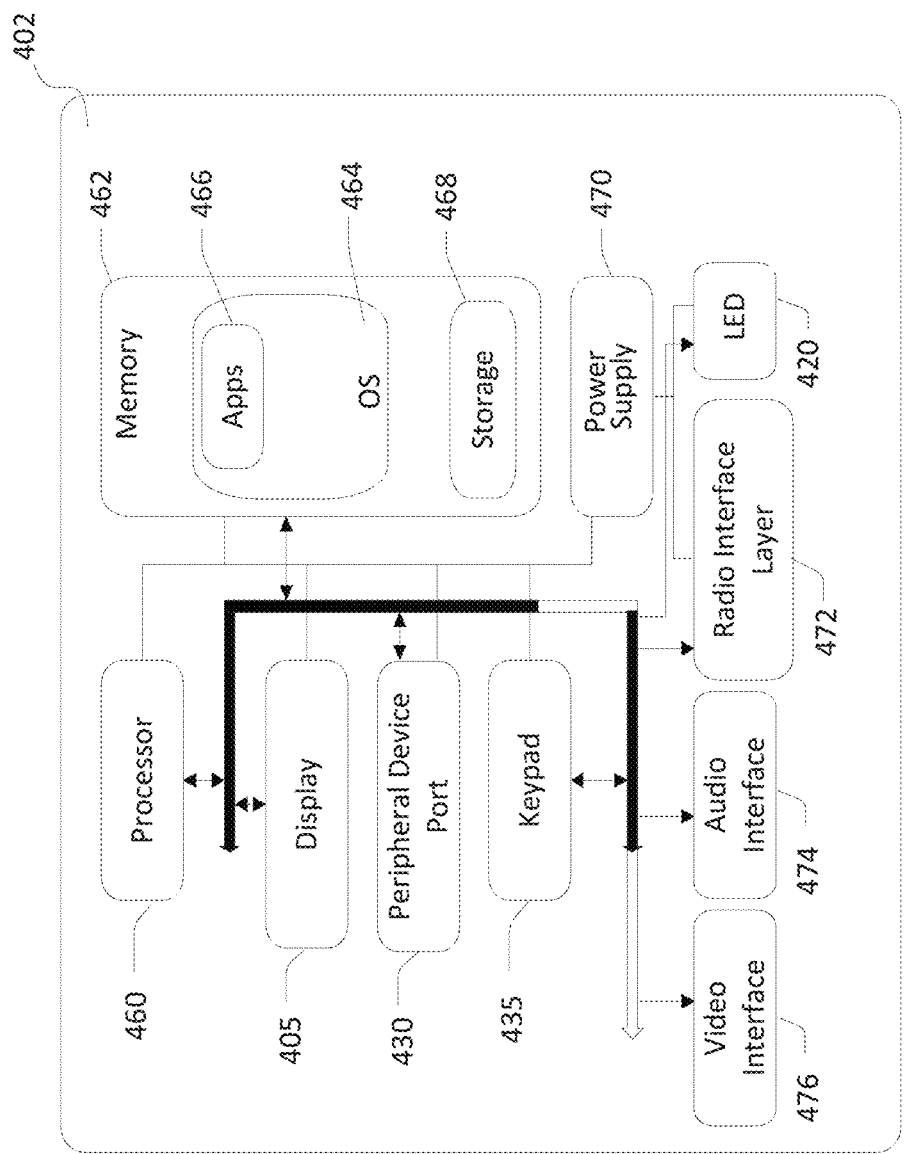

FIGS. 4A and 4B illustrate a mobile computing device 400, for example, a mobile telephone, a smart phone, a personal data assistant, a tablet personal computer, a phablet, a slate, a laptop computer, and the like, with which examples of the invention may be practiced. Mobile computing device 400 may be an exemplary computing device configured for processing by a contextual image analysis service as described herein. Application command control may be provided for applications executing on a computing device such as mobile computing device 400. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 4A, one example of a mobile computing device 400 for implementing the examples is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., touch screen display). If included, an optional side input element 415 allows further user input. The side input element 415 may be a rotary switch, a button, or any other type of manual input element. In alternative examples, mobile computing device 400 may incorporate more or less input elements. For example, the display 405 may not be a touch screen in some examples. In yet another alternative example, the mobile computing device 400 is a portable phone system, such as a cellular phone. The mobile computing device 400 may also include an optional keypad 435. Optional keypad 435 may be a physical keypad or a "soft" keypad generated on the touch screen display or any other soft input panel (SIP). In various examples, the output elements include the display 405 for showing a GUI, a visual indicator 420 (e.g., a light emitting diode), and/or an audio transducer 425 (e.g., a speaker). In some examples, the mobile computing device 400 incorporates a vibration transducer for providing the user with tactile feedback. In yet another example, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one example of a mobile computing device. That is, the mobile computing device 400 can incorporate a system (i.e., an architecture) 402 to implement some examples. In one examples, the system 402 is implemented as a "smart phone" capable of running one or more applications (e.g., browser, e-mail, calendaring, contact managers, messaging clients, games, and media clients/players). In some examples, the system 402 is integrated as a computing device, such as an integrated personal digital assistant (PDA), tablet and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device (e.g. system 402) described herein.

The system 402 has a power supply 470, which may be implemented as one or more batteries. The power supply 470 might further include an external power source, such as an AC adapter or a powered docking cradle that supplements or recharges the batteries.

The system 402 may include peripheral device port 430 that performs the function of facilitating connectivity between system 402 and one or more peripheral devices. Transmissions to and from the peripheral device port 430 are conducted under control of the operating system (OS) 464. In other words, communications received by the peripheral device port 430 may be disseminated to the application programs 466 via the operating system 464, and vice versa.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 566 via the operating system 464, and vice versa.

The visual indicator 420 may be used to provide visual notifications, and/or an audio interface 474 may be used for producing audible notifications via the audio transducer 425 (as described in the description of mobile computing device 400). In the illustrated example, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425 (shown in FIG. 4A), the audio interface 474 may also be coupled to a microphone to receive audible input, such as to facilitate a telephone conversation. In accordance with examples of the present invention, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape. Such additional storage is illustrated in FIG. 4B by the non-volatile storage area 468.

Data/information generated or captured by the mobile computing device 400 and stored via the system 402 may be stored locally on the mobile computing device 400, as described above, or the data may be stored on any number of storage media that may be accessed by the device via the radio 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio 472 or via a distributed computing network. Similarly, such data/information may be readily transferred between computing devices for storage and use according to well-known data/information transfer and storage means, including electronic mail and collaborative data/information sharing systems.

Figure 5:
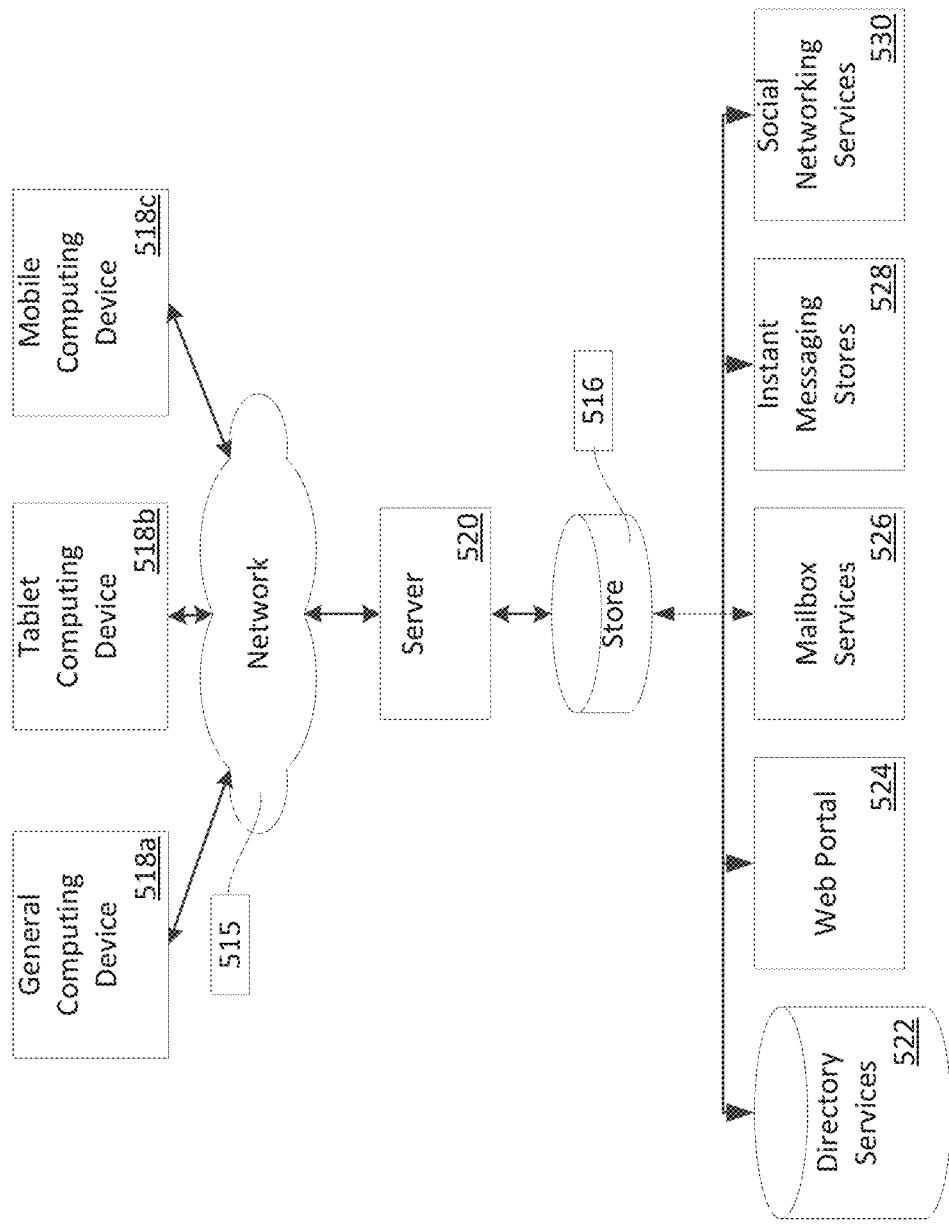
FIG. 5 is a simplified block diagram of a distributed computing system in which aspects of the present disclosure may be practiced.

FIG. 5 illustrates one example of the architecture of a system for providing an application that reliably accesses target data on a storage system and handles communication failures to one or more client devices, as described above. The system of FIG. 5 may be an exemplary system configured for processing by a contextual image analysis service as described herein. Target data accessed, interacted with, or edited in association with programming modules 608 and/or applications 620 and storage/memory (described in FIG. 6) may be stored in different communication channels or other storage types. For example, various documents may be stored using a directory service 522, a web portal 524, a mailbox service 526, an instant messaging store 528, or a social networking site 530, IO manager 624, other utility 626, application 628 and storage systems may use any of these types of systems or the like for enabling data utilization, as described herein. A server 520 may provide storage system for use by a client operating on general computing device 602 and mobile device(s) 400 through network 515. By way of example, network 515 may comprise the Internet or any other type of local or wide area network, and a client node may be implemented for connecting to network 515. Examples of a client node comprise but are not limited to: a computing device 602 embodied in a personal computer, a tablet computing device, and/or by a mobile computing device 400 (e.g., mobile processing device). As an example, a client node may connect to the network 515 using a wireless network connection (e.g. WiFi connection, Bluetooth, etc.). However, examples described herein may also extend to connecting to network 515 via a hardwire connection. Any of these examples of the client computing device 602 or 400 may obtain content from the store 516.

Figure 6:
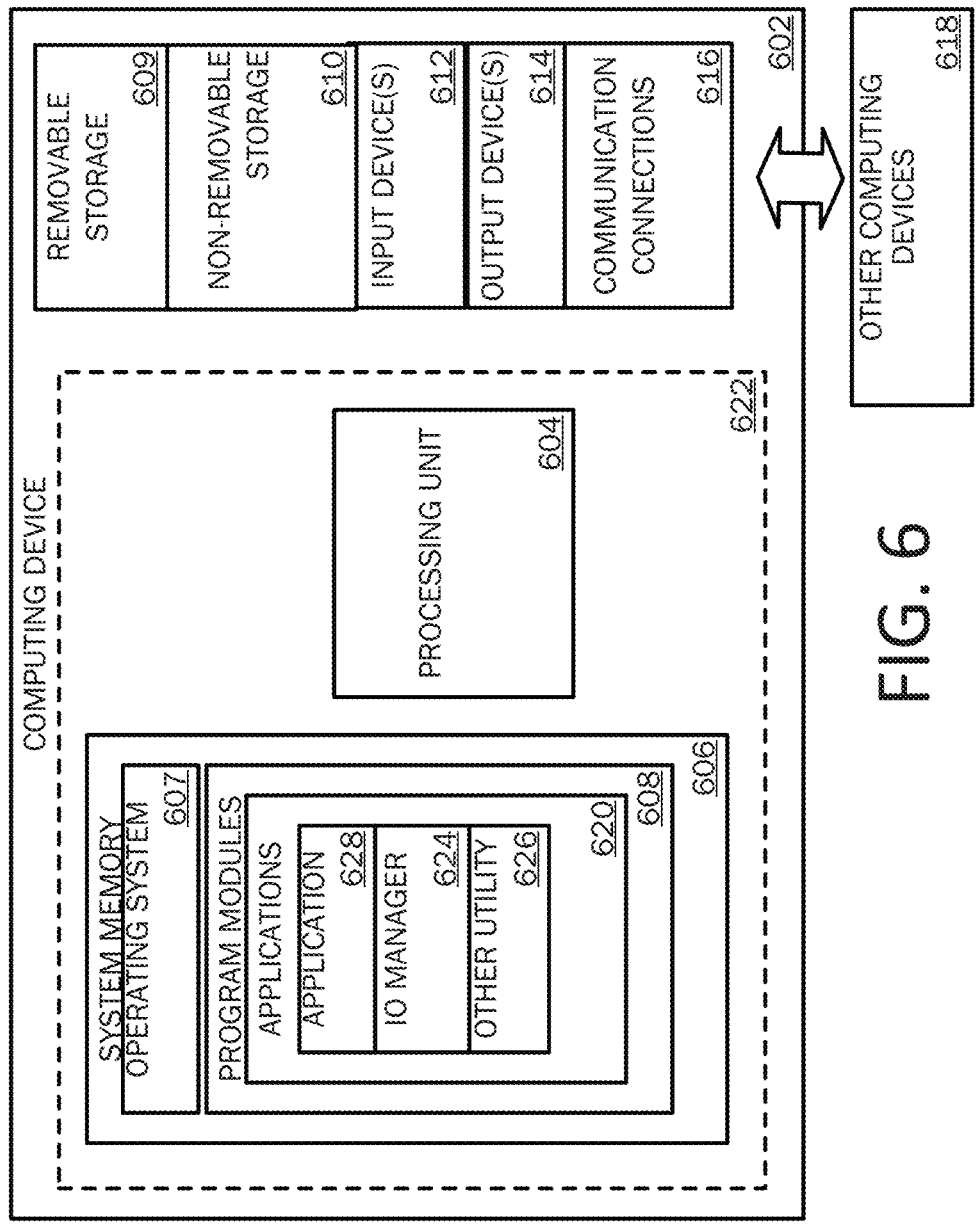
FIG. 6 is a block diagram illustrating an example of a computing device with which aspects of the present disclosure may be practiced.

FIG. 6 is a block diagram illustrating physical components of a computing device 602, for example a mobile processing device, with which examples of the present disclosure may be practiced. Among other examples, computing device 602 may be an exemplary computing device configured for processing by a contextual image analysis service as described herein. An exemplary computing device may be a server (or replicated as a group of servers) that are configured to execute components of an exemplary contextual image analysis service. In a basic configuration, the computing device 602 may include at least one processing unit 604 and a system memory 606. Depending on the configuration and type of computing device, the system memory 606 may comprise, but is not limited to, volatile storage (e.g., random access memory), non-volatile storage (e.g., read-only memory), flash memory, or any combination of such memories. The system memory 606 may include an operating system 607 and one or more program modules 608 suitable for running software programs/modules 620 such as IO manager 624, other utility 626 and application 628. As examples, system memory 606 may store instructions for execution. Other examples of system memory 606 may store data associated with applications. The operating system 607, for example, may be suitable for controlling the operation of the computing device 602. Furthermore, examples of the invention may be practiced in conjunction with a graphics library, other operating systems, or any other application program and is not limited to any particular application or system. This basic configuration is illustrated in FIG. 6 by those components within a dashed line 622. The computing device 602 may have additional features or functionality. For example, the computing device 602 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 606. While executing on the processing unit 604, program modules 608 (e.g., Input/Output (I/O) manager 624, other utility 626 and application 628) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, other productivity services, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 602 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 602 may also have one or more input device(s) 612 such as a keyboard, a mouse, a pen, a sound input device, a device for voice input/recognition, a touch input device, etc. The output device(s) 614 such as a display, speakers, a printer, etc. may also be included. The aforementioned devices are examples and others may be used. The computing device 602 may include one or more communication connections 616 allowing communications with other computing devices 618. Examples of suitable communication connections 616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 606, the removable storage device 609, and the non-removable storage device 610 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 602. Any such computer storage media may be part of the computing device 602. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method performed by a processor of a computing system, comprising:
   generating, by a contextual image analysis service, an annotation for an object located within an image, wherein the annotation identifies a type of the object;
   prefixing, by the contextual image analysis service, content to the annotation to generate a query, wherein the query is a question;

identifying, by the contextual image analysis service, a search result based upon the query, wherein the search result is an answer to the question;

causing a user interface to be displayed on a display, wherein the user interface comprises the image and the query;

responsive to receiving a selection of the query displayed within the user interface, updating the user interface to additionally display the search result; and causing a user interface feature to be presented on the display to allow user feedback for training the contextual image analysis service, wherein the contextual image analysis service adapts over time and learns at least one of placement, positioning, size, and amount of contextually relevant data objects to present to users, the contextually relevant data objects comprising questions and answers to the questions.

2. The method of claim 1, further comprising:
prior to updating the user interface to additionally display the search result, removing metadata from the search result.

3. The method of claim 1, wherein the search result comprises a first item and a second item that are duplicative to one another, the method further comprising:
prior to updating the user interface to additionally display the search result, removing the second item from the search result.

4. The method of claim 1, wherein the question is a trivia question.

5. The method of claim 1, wherein the question pertains to the object located within the image.

6. The method of claim 1, wherein the search result comprises video data.

7. The method of claim 1, wherein the search result comprises social network data.

8. A computing system comprising:
a processor; and
memory, operatively connected with the processor, storing computer-executable instructions that, when executed by the processor, cause the processor to perform acts comprising:
generating, by a contextual image analysis service, an annotation for an object located within an image, wherein the annotation identifies a type of the object;
prefixing, by the contextual image analysis service, content to the annotation to generate a query, wherein the query is a question;
identifying, by the contextual image analysis service, a search result based upon the query, wherein the search result is an answer to the question;
causing a user interface to be displayed on a display, wherein the user interface comprises the image and the query;
responsive to receiving a selection of the query displayed within the user interface, updating the user interface to additionally display the search result; and
causing a user interface feature to be presented on the display to allow user feedback for training the contextual image analysis service, wherein the contextual image analysis service adapts over time and learns at least one of placement, positioning, size, and amount of contextually relevant data objects to present to users, the contextually relevant data objects comprising questions and answers to the questions.

9. The computing system of claim 8, the acts further comprising:
prior to updating the user interface to additionally display the search result, removing metadata from the search result.

10. The computing system of claim 8, wherein the search result comprises a first item and a second item that are duplicative to one another, the acts further comprising:
prior to updating the user interface to additionally display the search result, removing the second item from the search result.

11. The computing system of claim 8, wherein the question is a trivia question.

12. The computing system of claim 8, wherein the search result comprises video data.

13. The computing system of claim 8, wherein the question pertains to the object located within the image.

14. The computing system of claim 8, wherein the search result comprises social network data.

15. A non-transitory computer-readable storage medium that stores computer-executable instructions that, when executed by a processor, cause the processor to perform acts comprising:
generating, by a contextual image analysis service, an annotation for an object located within an image, wherein the annotation identifies a type of the object;
prefixing, by the contextual image analysis service, content to the annotation to generate a query, wherein the query is a question;
identifying, by the contextual image analysis service, a search result based upon the query, wherein the search result is an answer to the question;
causing a user interface to be displayed on a display, wherein the user interface comprises the image and the query;
responsive to receiving a selection of the query displayed within the user interface, updating the user interface to additionally display the search result; and
causing a user interface feature to be presented on the display to allow user feedback for training the contextual image analysis service, wherein the contextual image analysis service adapts over time and learns at least one of placement, positioning, size, and amount of contextually relevant data objects to present to users, the contextually relevant data objects comprising questions and answers to the questions.

16. The non-transitory computer-readable storage medium of claim 15, the acts further comprising:
prior to updating the user interface to additionally display the search result, removing metadata from the search result.

17. The non-transitory computer-readable storage medium of claim 15, wherein the search result comprises a first item and a second item that are duplicative to one another, the acts further comprising:
prior to updating the user interface to additionally display the search result, removing the second item from the search result.

18. The non-transitory computer-readable storage medium of claim 15, wherein the question is a trivia question.

19. The non-transitory computer-readable storage medium of claim 15, wherein the search result comprises social network data.

20. The non-transitory computer-readable storage medium of claim 15, wherein the search result comprises video data.

* * * * *